(12) United States Patent
Harding

(10) Patent No.: US 10,583,421 B2
(45) Date of Patent: Mar. 10, 2020

(54) PHOTOCATALYTIC COATED GRANULES AND METHOD OF MAKING SAME

(71) Applicant: NITTO DENKO CORPORATION, Osaka (JP)

(72) Inventor: Brett T. Harding, Oceanside, CA (US)

(73) Assignee: Nitto Denko Corporation, Osaka (JP)

( * ) Notice: Subject to any disclaimer, the term of this patent is extended or adjusted under 35 U.S.C. 154(b) by 79 days.

(21) Appl. No.: 15/569,044

(22) PCT Filed: May 13, 2016

(86) PCT No.: PCT/JP2016/002369
§ 371 (c)(1),
(2) Date: Oct. 24, 2017

(87) PCT Pub. No.: WO2016/181661
PCT Pub. Date: Nov. 17, 2016

(65) Prior Publication Data
US 2018/0126360 A1    May 10, 2018

Related U.S. Application Data

(60) Provisional application No. 62/161,488, filed on May 14, 2015.

(51) Int. Cl.
*B01J 23/10* (2006.01)
*B01J 23/30* (2006.01)
(Continued)

(52) U.S. Cl.
CPC .......... *B01J 23/30* (2013.01); *B01D 53/8668* (2013.01); *B01J 21/16* (2013.01); *B01J 35/004* (2013.01);
(Continued)

(58) Field of Classification Search
CPC ... B01J 23/10; B01J 23/30; B01J 21/12; B01J 21/16; B01J 35/0006; B01J 35/004
See application file for complete search history.

(56) References Cited

U.S. PATENT DOCUMENTS

| | | | | |
|---|---|---|---|---|
| 4,221,768 A | * | 9/1980 | Inoue | B01D 53/945 423/213.2 |
| 5,658,546 A | * | 8/1997 | Kobayashi | B01D 53/8628 423/239.1 |
| 8,865,609 B2 | * | 10/2014 | Zhou | B01J 37/0244 502/100 |
| 8,927,786 B2 | * | 1/2015 | Zhou | C07C 29/149 568/885 |

(Continued)

FOREIGN PATENT DOCUMENTS

| | | |
|---|---|---|
| JP | 2008006419 A | 1/2008 |
| JP | 2009291717 A | 12/2009 |

(Continued)

OTHER PUBLICATIONS

International Search Report for PCT/JP2016002369, dated Sep. 8, 2016.

*Primary Examiner* — Cam N. Nguyen
(74) *Attorney, Agent, or Firm* — K&L Gates LLP; Louis C. Cullman; Hal Gibson

(57) ABSTRACT

These embodiments relate to a method of attaching photocatalytic materials to inorganic surfaces. A method is described wherein metal hydroxide is converted to metal oxide, creating metal oxide linkages to attach photocatalysts to an inorganic surface. The photocatalyst attached inorganic material is useful in products that can partially or fully oxidize certain volatile organic compounds from a gas or liquid stream.

5 Claims, 1 Drawing Sheet

(51) Int. Cl.
  *B01J 21/12* (2006.01)
  *B01J 21/16* (2006.01)
  *B01J 35/00* (2006.01)
  *B01J 37/08* (2006.01)
  *B01J 37/02* (2006.01)
  *B01D 53/86* (2006.01)
  *B01J 37/04* (2006.01)
  *B01J 37/10* (2006.01)
  *B01J 37/00* (2006.01)

(52) U.S. Cl.
  CPC ....... *B01J 35/0006* (2013.01); *B01J 37/0217* (2013.01); *B01J 37/0219* (2013.01); *B01J 37/0221* (2013.01); *B01J 37/04* (2013.01); *B01J 37/082* (2013.01); *B01J 37/10* (2013.01); *B01D 53/8687* (2013.01); *B01D 2255/2065* (2013.01); *B01D 2255/20707* (2013.01); *B01D 2255/20776* (2013.01); *B01D 2255/802* (2013.01); *B01D 2255/9202* (2013.01); *B01D 2257/708* (2013.01); *B01D 2257/90* (2013.01); *B01J 37/0036* (2013.01); *B01J 2523/00* (2013.01)

(56) References Cited

U.S. PATENT DOCUMENTS

| | | | | |
|---|---|---|---|---|
| 8,937,203 | B2* | 1/2015 | Zhou | B01J 37/0205 502/185 |
| 8,975,200 | B2* | 3/2015 | Zhou | B01J 37/0244 501/100 |
| 8,980,789 | B2* | 3/2015 | Zhou | B01J 37/0205 502/439 |
| 8,981,164 | B2* | 3/2015 | Zhou | B01J 37/0205 568/885 |
| 2008/0004175 | A1 | 1/2008 | Aoshima | |
| 2013/0178664 | A1* | 7/2013 | Zhou | B01J 37/0244 568/885 |
| 2013/0180932 | A1 | 7/2013 | Fukumura | |
| 2013/0184501 | A1* | 7/2013 | Zhou | B01J 37/0244 568/885 |
| 2013/0192976 | A1 | 8/2013 | Sambandan | |
| 2014/0228203 | A1 | 8/2014 | Sun | |
| 2014/0271916 | A1 | 9/2014 | Sambandan | |

FOREIGN PATENT DOCUMENTS

JP   2015513306 T   5/2015
WO   2014151861   9/2014

* cited by examiner

[Fig. 1]
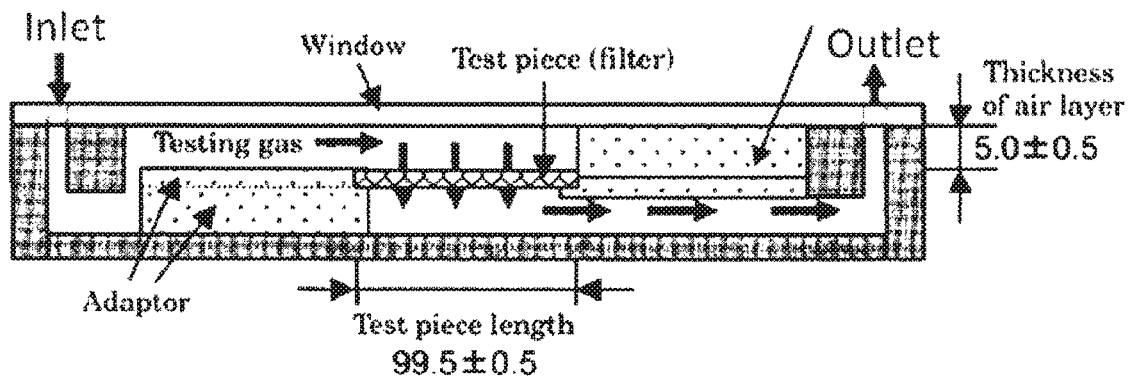
[Fig. 2]
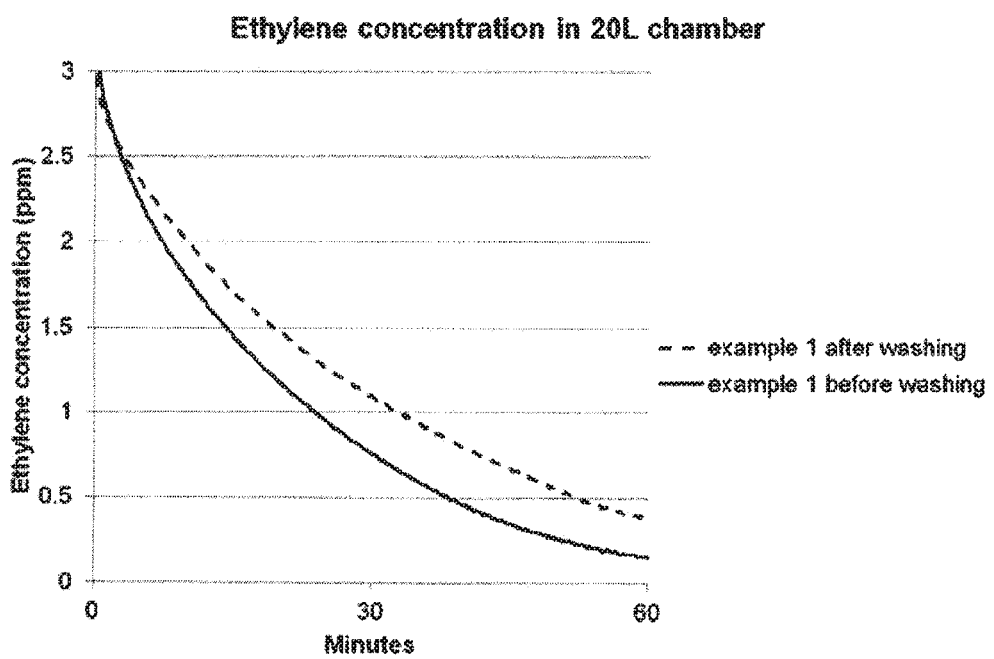

PHOTOCATALYTIC COATED GRANULES AND METHOD OF MAKING SAME

This application is the U.S. national phase of PCT Application No. PCT/JP2016/002369, filed May 13, 2016, which claims the benefit of U.S. Provisional Application No. 62/161,488, filed May 14, 2015. The contents of each of these applications are hereby incorporated herein in their entirety.

TECHNICAL FIELD

Current embodiments relate to a method of attaching inorganic particles to an inorganic substrate. Some embodiments provide a method to covalently bind metal/metalloid oxides with photocatalytic materials. The photocatalyst bound inorganic material can be useful in products that can decompose organic compounds under mild conditions.

BACKGROUND ART

Recently, the use of photocatalytic coated surfaces has become of interest due to their unique properties. These photocatalytic materials have been bound, disposed upon or loaded onto various substrates or surfaces, including thermoplastics, ceramics and textiles.

SUMMARY OF INVENTION

Unfortunately, there is a problem with the attachment of the photocatalytic material to the substrate. Thus there is a need for a method or an improved attachment of the photocatalytic materials to the substrate surface.

One challenge in the art is that coated or embedded particles are not well-bonded to the surface to which they are disposed; and, as the object is used, the photocatalytic elements fall off. As a result, an object with photocatalytic elements created by known methods will tend to lose the photocatalytic effectiveness as the amount of photocatalytic elements diminishes.

Thus there is a need for methods to produce various objects with photocatalytic elements, the photocatalytic element being sufficiently bonded to the substrate surface such that the amount of, and effectiveness of, the photocatalytic element can be maintained for a sufficient period of time despite normal use of the objects.

Some of the embodiments described herein provide a method to attach particles to an inorganic substrate. In particular, the method is useful for attaching photocatalytic materials or particles to an inorganic substrate. The method described herein, can therefore be used to manufacture a broad range of photocatalytic attached inorganic materials.

In some embodiments, a method for making a photocatalytic composite is described, the method comprising creating a mixture containing a metal hydroxide or metalloid hydroxide and a fluid carrier by mixing a metal oxide or metalloid oxide with the fluid carrier, adding a photocatalytic compound to the mixture containing the metal hydroxide or metalloid hydroxide and the fluid carrier, and converting the metal hydroxide or metalloid hydroxide to metal oxide or metalloid oxide by heating a mixture containing the metal hydroxide or metalloid hydroxide, the fluid carrier and the photocatalytic compound at a temperature greater than 250° C. In some embodiments, the method further comprises agitating the mixture containing the metal hydroxide or metalloid hydroxide, the fluid carrier and the photocatalytic compound a time sufficient to interact the photocatalytic compound with the metal hydroxide or metalloid hydroxide and/or hydrate the photocatalytic compound. In some embodiments, the method can further comprise heating the mixture containing the metal hydroxide or metalloid hydroxide, the fluid carrier, e.g., water, and the photocatalytic compound a time sufficient to remove volatile components of the fluid carrier. In some embodiments, the metal oxide or metalloid oxide can be selected from $Al_2O_3$ and $SiO_2$. In some embodiments, the metal oxide or metalloid oxide can be pumice. In some embodiments, the photocatalytic compound can be $WO_3$ and/or $TiO_2$. In some embodiments, the photocatalytic compound can be $WO_3$. In some embodiments, the photocatalytic compound can be $WO_3$ and Ceria ($CeO_2$). In some embodiments, the method further comprises washing the photocatalytic composite.

In some embodiments, a photocatalytic composite is described, the composite made according to the methods described above. In some embodiments, a photocatalytic element is described, the element comprising the any of the previously described composites.

In some embodiments, a photocatalytic composite is described, the composite comprising pumice comprising 5-50 at % $Al_2O_3$; and 95-50 at % $SiO_2$, and a photocatalytic compound comprising $WO_3$ and $CeO_2$, wherein at least two of $Al_2O_3$, $SiO_2$, $WO_3$ and $CeO_2$ are chemically bonded together. In some embodiments, the chemical bonding can comprise an —O— linkage.

These and other embodiments are described in greater detail below.

BRIEF DESCRIPTION OF DRAWINGS

FIG. 1 is a schematic view of the testing chamber used to evaluate the rate of ethylene decomposition by photocatalytic filter elements in the Examples.

FIG. 2 is a graph of the results of the ethylene decomposition test of Example 1.

DESCRIPTION OF EMBODIMENTS

In some embodiments, a method for making a photocatalytic composite film is described, the method comprising creating a mixture containing a metal hydroxide or metalloid hydroxide and a fluid carrier by mixing a metal oxide or metalloid oxide with the fluid carrier, adding a photocatalytic compound to the mixture containing the metal hydroxide or metalloid hydroxide and the fluid carrier, converting the metal hydroxide or metalloid hydroxide to metal oxide or metalloid oxide by heating a mixture containing the metal hydroxide or metalloid hydroxide, the fluid carrier and the photocatalytic compound at a temperature greater than 250° C. In some embodiments, the method further comprises agitating the mixture containing the metal hydroxide or metalloid hydroxide, the fluid carrier and the photocatalytic compound a time sufficient to interact the photocatalytic compound with the metal hydroxide or metalloid hydroxide. In some embodiments, the method can further comprise heating the mixture containing the metal hydroxide or metalloid hydroxide, fluid carrier and the photocatalytic compound a time sufficient to remove volatile components of the fluid carrier. In some embodiments, the metal oxides or metalloid hydroxide can be selected from $ZrO_2$, $CeO_2$, $CeZrO_4$, $Al_2O_3$ and $SiO_2$. In some embodiments, the metal oxides or metalloid hydroxide can be pumice. In some embodiments, the photocatalytic compound can be $WO_3$ and/or $TiO_2$. In some embodiments, the photocatalytic compound can be $WO_3$. In some embodiments, the photocatalytic compound can be $WO_3$ and Ceria. In some embodiments, the method further comprises washing the photocatalytic composite.

In some embodiments, a photocatalytic composite is described, the composite made according to the methods described above. In some embodiments, a photocatalytic element is described, the element comprising the any of the previously described composites.

In some embodiments, a photocatalytic composite is described, the composite comprising pumice comprising 5-50 at % $Al_2O_3$ and 95-50 at % $SiO_2$, and a photocatalytic compound comprising $WO_3$ and $CeO_2$, wherein at least two of $Al_2O_3$, $SiO_2$, $WO_3$ and $CeO_2$ are chemically bonded together. In some embodiments, the chemical bonding can comprise an —O— linkage.

The term oxide refers to a compound including an oxygen atom and another atom, e.g., a metal (aluminum, titanium) or a metalloid (boron, silicon).

The term hydroxide refers to a compound including a hydroxyl (—OH) group.

In some embodiments, a method for making a photocatalytic composite film is described, the method comprising creating a mixture containing a metal hydroxide or metalloid hydroxide and a fluid carrier by mixing a metal oxide or metalloid oxide with a fluid carrier, e.g., water or a binder sol, adding a photocatalytic compound to the mixture containing the metal hydroxide or metalloid hydroxide and the fluid carrier, converting the metal hydroxide or metalloid hydroxide to metal oxide or metalloid oxide by heating the hydrated oxide/fluid carrier/photocatalytic compound mixture at a temperature greater than 250° C. In some embodiments, the method further comprises agitating the oxide photocatalytic compound and fluid carrier mixture a time sufficient to interact the photocatalytic compound with the hydrated oxide. In some embodiments, the metal oxides or metalloid oxides can be selected from $Al_2O_3$ and $SiO_2$. In some embodiments, the metal oxides or metalloid oxides can be pumice. In some embodiments, the photocatalytic compound can be doped or undoped $WO_3$ and/or $TiO_2$. In some embodiments, the photocatalytic compound can be $WO_3$. In some embodiments, the photocatalytic compound can be doped or undoped $CeZrO_4$. In some embodiments, the photocatalytic compound can be $WO_3$ and Ceria. In some embodiments, the method further comprises washing the photocatalytic composite.

In some embodiments, a photocatalytic composite is described, the composite made according to the methods described above. In some embodiments, the composite comprises an inorganic granule and a photocatalytic material, the photocatalytic material disposed on an exterior surface of the inorganic granule. In some embodiments, the photocatalytic material is chemically bonded to the exterior surface of the inorganic granule. In some embodiments, the photocatalytic material is covalently bonded to the exterior surface of the inorganic granule. In some embodiments, the photocatalytic material is covalently bonded to the exterior surface of the inorganic granule thorough an —O— linkage. In some embodiments, a photocatalytic element is described, the element comprising the any of the previously described composites. In some embodiments, the inorganic material can be pumice.

In some embodiments, a photocatalytic composite is described, the composite comprising pumice, in which the pumice can comprise 5-50 at % $Al_2O_3$ and 95-50 at % $SiO_2$, and a photocatalytic compound, in which the photocatalytic compound can be $WO_3$ and $CeO_2$, wherein at least two of $Al_2O_3$, $SiO_2$, $WO_3$ and $CeO_2$ are chemically bonded together. In some embodiments, the chemical bonding can comprise an —O— linkage.

In some embodiments, the method includes creating metal hydroxide mixture by mixing a metal oxide. e.g., aluminum oxide ($Al_2O_3$), or metalloid oxide. e.g., silicon dioxide ($SiO_2$), with fluid carrier. In some embodiments, the metal oxide can be $WO_3$ and $CeO_2$, which can react with the fluid carrier, e.g., water, in the same way as alumina and silica, where surface metal oxides are converted to metal hydroxides. In some embodiments, the oxide comprises at least one M=O functional group. In some embodiments, the oxide comprises at least one surface M=O functional group.

In some embodiments, the metal oxide or metalloid oxide can be rare earth element. In some embodiments, the metal hydroxide can comprise cerium, tungsten, tantalum, tin, zinc, strontium, zirconium, barium, indium, niobium, vanadium, iron, cadmium, germanium silicon and/or aluminum. The metal or metalloid oxide can also comprise CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, $SiO_2$, $WO_3$ or $CeO_2$. In some embodiments, the metal oxide material can be cerium oxide ($CeO_2$). In some embodiments, the metal oxide material can comprise manganese oxide. In some embodiments, the composition can further comprise a non-photocatalytic metal oxide. In some embodiments, the metal oxide or metalloid oxide can be pumice. In some embodiments, pumice can comprise between 5-50 at % $Al_2O_3$ and 95-50 at % $SiO_2$. In some embodiments, pumice can further comprise 0-10 at % of at least one of ferric oxide ($Fe_2O_3$), calcium oxide (CaO), magnesium oxide (MgO), sulfur trioxide ($SO_3$), potassium oxide ($K_2O$), sodium oxide ($Na_2O$) and/or any combination of the above. In some embodiments, the pumice can have a porosity of at least 50%, 60%, 75%, 80%, and/or 90% air voids. In some embodiments, the pumice can be a porous granule. In some embodiments, the porous granule can have a generally spherical and/or ovoid morphology. In some embodiments, the pumice can have a greatest diameter of about 0.1, 0.2, 0.5, 1.0, 1.5, 2.0, 2.5, 3.0, 4.0, and/or 5.0 mm. In some embodiments, the pumice can be powdered pumice, for example, those produced by VitroCo (Vitrolite®), Elkem (Sidistar®), Hess and combinations thereof.

In some embodiments, the metal or metalloid comprising at least one M=O functional group reacts with fluid carrier to create a metal or metalloid hydroxide. In some embodiments, the method further comprising agitating the metal oxide or metalloid oxide comprising at least one M=O functional group a time sufficient to interact the photocatalytic compound with the hydrated oxide.

In some embodiments, the fluid carrier is provided to alter the surface of the inorganic substrate, e.g., hydrate or convert the hydroxide functional group to a hydroxyl functional group, and/or disperse the photocatalytic material throughout the inorganic substrate. In some embodiments, the fluid carrier can be a protic solvent. The term protic solvent refers to a solvent comprising at least one hydroxyl (—OH) functional group. In some embodiments, the fluid carrier can be water. In some embodiments, the fluid carrier can be a binder sol. In some embodiments, the fluid carrier may include TEOS (tetraethylorthosilicate), water, ethanol, methanol, propanol, butanol, pentanol, hexanol, hydrochloric acid, transition metal salts, triethanolamine, acetic acid, formic acid, propionic acid, phosphoric acid, sulfuric acid, nitric acid, ammonia, ammonium hydroxide, ammonium carbonate, urea, organic polymers such as polyvinyl alcohol, polyacrylic acid, polyethylene imine, chitosan, fumed silica, or a transition metal alkoxide such as aluminum(III)sec-butoxide, titanium(IV)butoxide, cerium(II)butoxide, zirconium(IV)butoxide, and or mixtures thereof. In some embodiments, the fluid carrier can be substantially only water; a mixture of water and hydrochloric acid (HCl); a mixture of water+TEOS+ethanol+HCl; a mixture of water+ethanol; and/or a mixture of water+ethanol+HCl.

In some embodiments, the metal or metalloid oxide reacts with the fluid carrier, e.g., water, to create a metal or metalloid hydroxide, a compound having at least one M-O—H functional group. While not wanting to be bound by theory, it is believed that any contact of the metal or metalloid oxide with water can provide at least some conversion of the hydroxide functional group[s] to hydroxyl functional group[s]. Agitation, addition of acid or alkali (altering the pH of the fluid carrier), and/or heating can fa-cilitate the conversion of surface oxides to surface hydroxides. Suitable methods for determining the presence of a metal or metalloid hydroxide include Fourier Transform Infrared Spectroscopy (FTIR) and/or Diffuse Reflectance Infrared Fourier Transform (DRIFT). For example, the hydrated metal oxide material can be collected on a filter, dried in streaming dry air at room temperature, then measured by FTIR. The presence of a peak in the hydroxyl range around 3000 cm$^{-1}$ wavenumbers could indicate the presence of hydroxyl. DRIFT could also detect a characteristic hydration peak.

In some embodiments, the metal oxide nanoparticle comprises a photocatalytic compound. In some embodiments, the photocatalytic compound is disposed on the surface of the inorganic granule. In some embodiments, the photocatalytic material is covalently bound to the inorganic granule. In some embodiments, the photocatalytic material is covalently linked through a —O— chemical bond or linkage.

In some embodiments, the method can comprise agitating the oxide compound and the fluid carrier, e.g., water, a time sufficient to sufficiently wet or hydrate the oxide compound. In some embodiments, the method can comprise agitating the oxide compound and the fluid carrier, e.g., water, a time sufficient to convert at least one M=O functional group of the metal oxide to an M-OH functional group. In some embodiments, the time sufficient can be about 5 minutes to about 2 hours.

Photocatalysts are well known to those skilled in the art as substances that help bring about a light-catalyzed reaction and function to decompose, kill, deodorize and inhibit the growth of nuisance organisms. They are also known to bring about a light-catalyzed reaction and function to partially or fully oxidize volatile organic and inorganic compounds. In some embodiments, the photocatalytic compound can be doped or undoped $TiO_x$, doped or undoped $WO_x$, doped or undoped $SnO_x$, doped or undoped $CeO_x$, or any combination thereof. In some embodiments, the doped $TiO_x$ compound can be $TiSn(CNO)_2$ as described in U.S. patent application Ser. No. 13/741,191, filed Jan. 14, 2013 (United States Publication No. 2013/0192976, published Aug. 1, 2013) which is incorporated by reference in its entirety. In some embodiments, the photocatalytic compound can be a $Cu_xO$ loaded photocatalytic composite as described in U.S. patent application Ser. No. 13/840,859, filed Mar. 15, 2013; and/or U.S. Provisional Application 61/835,399, filed Jun. 14, 2013, which are incorporated by reference in their entirety. Photocatalytic particles are often in powder form. In some embodiments, the photocatalytic particles are in powder form. In some embodiments, the photocatalytic material comprises W and/or Ti. In some embodiments, the photocatalytic material can be $WO_3$. In some embodiments, the photocatalytic material can be $TiO_2$.

In some embodiments, the photocatalytic material can be comprised of particles of a narrowly-distributed particle size range between 0.1 and 1.0 micron. In some embodiments, the narrowly distributed particle size can be less than 10 microns. In some embodiments, the narrowly distributed particle size can be less than 1.0 micron. In some embodiments, the narrowly distributed particle size can be less than 0.5 microns. In some embodiments, the photocatalytic material can be that prepared in accordance with co-pending patent application filed concurrently herewith, (U.S. Provisional Application, entitled "Methods for processing powder of photocatalyst", Application No. 62/161,516, filed May 14, 2015).

In some embodiments, the method can comprise agitating the oxide compound, photocatalytic material and fluid carrier, e.g., water, a time sufficient to sufficiently disperse the photocatalytic material over the oxide compound. In some embodiments, the time sufficient can be about 5 minutes to about 2 hours.

In some embodiments, the method can comprise converting the metal and/or metalloid hydroxide to metal oxide and/or metalloid oxide. In some embodiments, the conversion of the metal hydroxide to metal oxide can be by heating the mixture of the metal hydroxide, fluid carrier (such as water) and the photocatalytic compound at temperature greater than 250° C. In some embodiments, the heating of the metal hydroxide/fluid carrier (such as water)/photocatalytic compound mixture can be at a temperature between about 200° C. 250° C. and/or about 300° C. to about 450° C. 500° C. and/or about 550° C., and/or any combinations of the aforedescribed values, e.g., about 400° C. While not wanting to be limited by theory, it is believed that heating at high temperatures, e.g., such as 400° C. and higher, adjacent metal-hydroxides undergo a condensation reaction which covalently binds the metal oxide surfaces together and liberates chemical water, according to the general formula: M1-OH+M2-OH→M1-O-M2+$H_2O$, where M1 is a first metal or metalloid atom, and M2 is a second metal or metalloid atom. Thus, adjacent metal hydroxide surfaces may become chemically fused together at high temperatures, providing excellent adhesion. In some embodiments, the method can comprise converting the metal hydroxides to metal oxides at least once. In some embodiments, the method can further comprise converting the metal hydroxides to metal oxides again after washing the coated particles to remove unfused materials.

Once the conversion of the hydroxide to the oxide occurs, the coated particles can be baked to evaporate substantially all of the fluid carrier and/or volatile components of the fluid carrier, leaving the particles firmly attached to one another. Standard methods known in the art can be used to evaporate the fluid carrier and/or volatile components of the fluid carrier. In some embodiments, the heating of the composition is at a sufficient temperature and/or time to substantially remove all of the fluid carrier and/or volatile components of the fluid carrier without effecting bumping or cracking of the substrate and/or granules. The baking temperature and time may be chosen appro-priately based on the fluid carrier and the particles. In some embodiments, the fluid carrier may evaporate at room temperature after a certain period of time, and therefore the baking temperature may be equal to room temperature. In some embodiments, the baking temperature may be at least 100° C., if for instance, the fluid carrier is water. In some embodiments, the method can comprise removing the fluid carrier from the oxide/photocatalytic material/fluid carrier mixture. In some embodiments, the fluid carrier mixture can be heated at a temperature less than 250° C. In some embodiments, the fluid carrier mixture can be heated at a temperature between about 90° C. to 150° C.

In some embodiments, the method further comprises washing the fused metal oxides/photocatalytic composite. In some embodiments, washing the fused metal oxides/photocatalytic composite comprises flushing the fused metal oxides/photocatalytic composite with a sufficient amount of water to remove any unfused metal oxide and/or photocatalytic material. In some embodiments the amount of water can be at least 25 ml, 50 ml, 75 ml, 100 ml, 200 ml, 300 ml, and/or up to 1000 ml of water per 10 g of the composite embodiments described herein.

In some embodiments, the method further comprises mixing a first photocatalyst pumice granule with a second photocatalyst pumice granule. In some embodiments the first photocatalyst pumice granule can be $WO_3$ and the second can be a second photocatalytic material. In some embodiments, the second photocatalytic material can comprise titanium oxide. In some embodiments, the ratio of tungsten oxide to titanium oxide granules can be from 1:1 to about 10:1.

The adhesion strength of the attached photocatalytic material to the inorganic substrate, e.g., granules, can be measured by methods known in the art. In some embodiments, adhesion strength of the coating on the granules can be tested by soaking the coated granules in water, filtering the soaked granules through a coarse mesh, drying, then measuring the mass difference of the granules before and after washing, or by drying out the filtrate and measuring how much material passed through the filter mesh.

EXAMPLES

The embodiments will be explained with respect to certain embodiments which are not intended to limit the present invention. Further, in the present disclosure where conditions and/or structures are not specified, the skilled artisan in the art can readily provide such conditions and/or structures, in light of the teachings herein, as a matter of routine experimentation.

Synthesis of Oxide/Photocatalytic Particles

Example 1

Slurry Preparation 70 g of $WO_3$ powder (Nanostructured & Amorphous Materials, Inc., Houston, Tex.), 150 g of zirconium milling balls (Zr) and 130 ml of ethanol were added to a 250 ml yttrium stabilized zirconium ball milling jar. The $WO_3$ slurry was then milled using a planetary ball milling machine at a rate of 15 Hz for 18 hours.

After milling, the $WO_3$ slurry was transferred to a quartz beaker and dried at 110° C. until the ethanol was completely evaporated (about 6 hours). The resulting dried $WO_3$ powder was then ground with an agar pestle and mortar for about 5 minutes. Then the $WO_3$ powder was passed through a 30-mesh sieve prior to annealing treatment. For annealing treatment, the sieved and dried $WO_3$ powder was added into a 100 ml quartz crucible and heated to about 400° C. in ambient atmosphere for about 5 hours.

Centrifuging 200 ml of the slurry as prepared as described in Example 1 was prepared for cen-trifugation. For centrifuge separation, 20 g of $WO_3$ powder and 180 ml of de-ionized water was added to a high density polypropylene jar to create a $WO_3$ content of 10 wt %. The $WO_3$ slurry was treated in a planetary mixer (THINKY Mixer ASRE-310, THINKY, Laguna Hills, Calif.) at 2000 rpm for 2 minutes. Then the supernatant containing a portion of the particle population was removed and retained. The sediment of larger sized $WO_3$ particles was separately collected.

A second centrifuge separation was conducted using a commercial centrifuge machine (IEC Centra CL2, Thermo ELECTRON Corporation, Waltham, Mass.). The supernatant, substantially all of the initial 200 ml, obtained from the first centrifuge separation was added to a polypropylene centrifuge tube (45 ml, VWR SuperClear™) and run at about 1500 rpm for about 5 minutes. The resulting supernatant was collected in a glass beaker and dried at about 110° C. for about 10 hours in ambient atmosphere. The resulting $WO_3$ particle size appeared suitable for characterization of VOC decomposition performance evaluation. The $WO_3$ particle size was between about 1.4 to about 3.1 mm in diameter.

Example 2

Lab-Scale Coating Process 16.0 g of granular pumice (Grade 8 [mesh 6-14]. Kramer Industries) were placed in a 60 ml glass jar with a lid. 16 g of pumice grade 8 was about 46 ml. 6.0 g of pure water (MilliQ) was added to the jar. The jar containing 16 g of pumice and 6 g of water was capped and shaken using a lab vortexer. The duration of shaking was about 3-5 minutes, monitored visually to confirm that all of the pumice was thoroughly wetted. 5.7 g of catalyst powder prepared as described in Example 1 above was added to the jar. Catalyst powder was a 1:1 molar ratio of $WO_3$:$CeO_2$. For example, the 5.7 g of powder is a mixture of 3.27 g of $WO_3$ prepared as described above, and 2.43 g of $CeO_2$ (Sigma Aldrich). The jar containing pumice, water, $WO_3$ and $CeO_2$ was capped and shaken using a lab vortexer. The duration of shaking was about 3-5 minutes, monitored visually to confirm that the coating is uniform on all of the granules. The open jar was covered with aluminum foil and placed in a preheated 110° C. oven for about 15-hours to remove excess water. After heating, the aluminum foil was removed and the uncapped jar was placed in a box furnace and temperature was set to 400° C. for 2-hours, heating ramp rate was approximately 20° C./minute to condense and remove water by conversion of the metal hydroxides into metal oxides. After about 2-hours at 400° C. the furnace was turned off and allowed to cool to room temperature. The PCAT-coated granules were washed by dropping the formed granules into a beaker containing de-ionized water (100 ml). After gentle swirling for about 10 seconds, the granules were collected on a plastic bonded fiber filter sheet to separate out any fine particles that did not fuse to the substrate. The granules were additionally rinsed with about 100 ml of DI water while on the filter to remove particles that did not fuse to the substrate. The PCAT-granules were then placed in a clean, uncapped jar and stored in a 110° C. oven for at least 6 hours to remove the water. The jar containing the dried PCAT granules was placed in a box furnace and temperature was set to 400° C. for 1-hour to further desorb any residual water. Heating ramp rate was about 20° C./minute. After 1-hour at 400° C., the oven was turned off and allowed to reach room temperature.

Examples 3 to 4F2

In Example 3 (A-4), the coating process was performed in a manner described with respect to Example 2, except that 1, 2, 3 and 5 wt % fumed silica (Evonik, aerosol-200) were mixed in water, sonicated for about 30 minutes, then added to hydrated/sonicated pumice mixture.

In Example 4A, a 14.3 molar % TEOS, 42.9 molar % ethanol, and 57.1 molar % pH 2.0 acidified water mixture was stirred for about 1 hour, then added to the hydrated/sonicated pumice mixture.

In Examples 4B-4F, the coating process was performed in a manner described above except that the amount of TEOS was modified (by adding the appropriate amount of water) to provide a TEOS derived silica content of 1 wt % (Example 4B), 3 wt % (Example 4C), 5 wt % (Example 4D), 7 wt % (Example 4E) and 14 wt % (Example 4F) relative to the photocatalyst in the composition after baking.

In Examples 4B2-4F2, the coating process was performed in a manner described above except that an amount of fumed silica was added to the TEOS modified examples above to provide a 1 wt % fumed silica embodiment of the TEOS derived silica content of 1 wt % (Example 4B-2), 3 wt % (Example 4C-2), 5 wt % (Example 4D-2), 7 wt % (Example 4E-2) and 14 wt % (Example 4F-2) relative to the photocatalyst in the composition after baking.

Example 5

Ethylene Removal

A 5 cm wide, 5 cm long and 5 mm deep frame of polypropylene with about 4.9 cm apertures at the top and bottom was constructed. A sheet of 1 mm opening mesh was attached to the bottom of the frame, across the bottom opening, and an amount of photocatalytic granules prepared as described above was disposed atop the mesh and within the frame. A sufficient amount of granules was disposed to fill the frame, level with the top of the frame (about 12 cc or about 4 grams of granules). A second sheet of 1 mm opening mesh was attached to the top of the frame, entrapping the photocatalytic granules within the frame. The photocatalytic granules filled frame was placed in a flat reaction chamber, as in the industrial standard evaluation JIS R1701/ISO22197-1. See FIG. 1. The inlet of the testing chamber supplied a continuous 1 Liter per minute flow of 10% ethylene-containing ambient air. The concentration of ethylene was measured in the gas at the outlet. The difference in ethylene concentration between the inlet and outlet shows the photocatalyst activity. The coated $WO_3$ granules removed ethylene at about 2.5-3.0 ppm per hour. See FIG. 2.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed indi-vidually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described cm-bodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The present application is based on a U.S. provisional application No. 62/161,488 filed May 14, 2015, the contents of which are incorporated herein by reference.

The invention claimed is:

1. A photocatalytic composite comprising:
   pumice comprising 5-50 wt % $Al_2O_3$ and 95-50 wt % $SiO_2$, and
   a photocatalytic compound comprising $WO_3$ and $CeO_2$, wherein at least two of $Al_2O_3$, $SiO_2$, $WO_3$ and $CeO_2$ are chemically bonded together.

2. The photocatalytic composite according to claim 1, wherein the chemical bonding comprises an —O— linkage.

3. The photocatalytic composite according to claim 1, wherein said pumice further comprises 0-10 wt % of at least one of ferric oxide ($Fe_2O_3$), calcium oxide (CaO), magnesium oxide (MgO), sulfur trioxide ($SO_3$), potassium oxide ($K_2O$), sodium oxide ($Na_2O$), or combinations thereof.

4. The photocatalytic composite according to claim 1, wherein said pumice comprises a porous granule.

5. The photocatalytic composite according to claim 1, wherein said pumice comprises powdered pumice.

* * * * *